W. G. FAY.
CONTACT PAD FOR SPECTACLES.
APPLICATION FILED MAY 29, 1908.
915,757.
Patented Mar. 23, 1909.
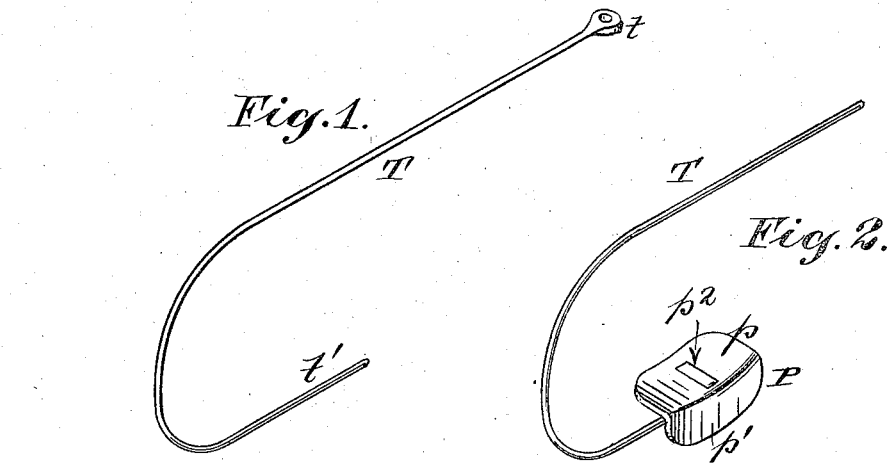
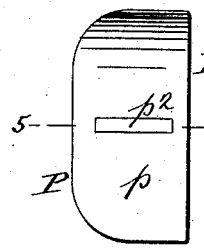
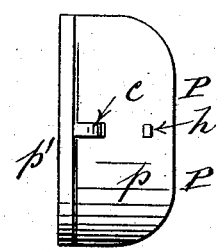
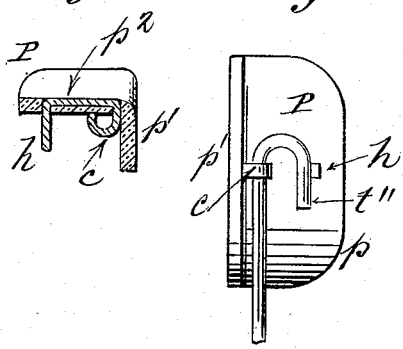
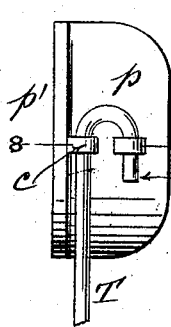
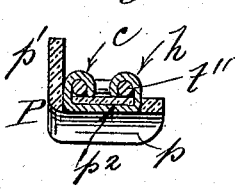
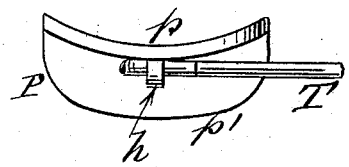
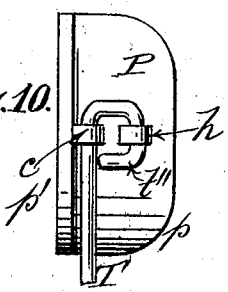

UNITED STATES PATENT OFFICE.

WALDO G. FAY, OF PELHAM, NEW YORK.

CONTACT-PAD FOR SPECTACLES.

No. 915,757.   Specification of Letters Patent.   Patented March 23, 1909.

Application filed May 29, 1908. Serial No. 435,615.

*To all whom it may concern:*

Be it known that I, WALDO G. FAY, a citizen of the United States, residing in Pelham, Westchester county, and State of New York, have invented certain new and useful Improvements in Contact-Pads for Spectacles, of which the following is a specification.

My invention is designed not only to adapt spectacle temples more perfectly to the requirements and comfort of individual users but also to afford certain practical and economical advantages to the optician. It has heretofore been customary and necessary for an optician to carry in stock four or five different lengths of temple to meet the requirements of trade. This I obviate by the use of a plain temple of maximum length in conjunction with a contact pad which may be applied thereto and adjusted thereon to meet the personal configuration and requirements of the customer—the surplus length of temple, if any, being then cut off, and the end of the temple bent over and secured to the pad in such manner as to afford practically a rigid connection between the parts, substantially as hereinafter described and claimed.

By dispensing with the enlargement or ball ordinarily formed on the end of the temple, I also economize in the cost of its manufacture, and attain a temple which is adapted for universal use—one maximum size thereof covering all the requirements of the trade. Furthermore the use of a pad which may be regulated in position upon the temple with accuracy to conform to the person of the user adds greatly to the comfort and convenience of the latter. I am also enabled to use a pad of special shape and having a relatively large surface for contact with the ear and head of the wearer thereby distributing strain and obviating danger of irritation and discomfort by reason of frictional contact or pressure concentrated within a small area as heretofore.

In the accompanying drawings, Figure 1, is a view of a temple used in connection with my pad; Fig. 2, is a view of the rear end of the temple with the pad attached thereto; Fig. 3, is an enlarged view of the face of the pad; Fig. 4, a similar view of the rear of the pad; Fig. 5, a cross section upon plane of line 5—5 Fig. 3; Fig. 6, a view similar to Fig. 4, showing the bent end of the temple in position; Fig. 7, a similar view showing the pad secured to the end of the temple; Fig. 8, a cross section upon plane of line 8—8 Fig. 7; Fig. 9, an edge view of Fig. 7. Fig. 10, is a view similar to Fig. 7, showing a modification of the bent end of the temple.

T represents a temple of an ordinary pair of spectacles, formed with the usual knuckle $t$, by means of which it is hinged to the lens post or frame, its rear portion being preferably of uniform diameter.

P is an ear pad. It may be made of any desired material, as may be found most expedient. It is approximately rectangular in cross section, so as to afford a convex bearing $p$, for the rear portion of the anti-helix of the ear, and a lateral bearing $p'$, to rest against the head of the wearer. On its rear side it is provided with a clasp $c$, adapted to pass over the end $t'$, of the temple T, so that the pad P may be slid thereon. It is also provided at its rear side with a holder $h$, for the end of the temple when said end is bent over to prevent the removal of the clasp $c$. This holder $h$, is preferably in the form of a tongue as shown in Figs. 4, 5 and 6, of the drawings, which tongue may be bent over to clamp the bent end $t''$, of the temple or what is practically the same thing, it may consist of a second clasp or loop through which the bent end of the temple is passed as in Fig. 10. In either case the function of the holder $h$, is to retain the bent end $t''$, of the temple T and thereby secure the pad to the temple. By the term clasp ($c$) herein is meant any form of loop, sleeve, eye, hook, yoke or clasp adapted to embrace and slide over the rear portion of the temple.

It is obvious that the clasp $c$, or other equivalent mechanical expedient, and holder $h$, may be formed upon the pad in various ways, and I do not restrict myself in this respect. In the structure represented by way of illustration in the drawings, the pad P is supposed to be made of celluloid or other suitable material in which is embedded a staple plate $p^2$, the respective ends of which are formed into and constitute the clasp $c$, and the holder $h$, as will be understood by reference more particularly to Figs. 5 and 8.

The pad P is reversible in the sense that it may be applied to either the right or left hand temple of a pair of spectacles.

In practice when it is desired to fit a customer with a pair of spectacles, a pad P is applied to each temple by passing the end of the latter through the clasp c, of the pad. Each pad is then fitted carefully and accurately to the ear and head of the person by sliding it along the temple until the most advantageous and comfortable position is located, and marked on the temple, after which the surplus length of temple is cut off and the end thus formed is bent over double and either passed through the holder h, and bent to prevent its return as in Fig. 10, or the holder h, is bent down over and against the bent end of the temple with sufficient force to retain the latter in position. The result is the same in either case in that the pad is securely attached to the temple in the prescribed position.

What I claim as my invention and desire to secure by Letters Patent is,

The combination of a spectacle temple, a contact pad, a clasp on said contact pad adapted to slide over the rear portion of the temple, and a holder on said contact pad adapted to secure the bent end of the temple, for the purpose described.

WALDO G. FAY.

Witnesses:
D. W. GARDNER,
GEO. WM. MIATT.